Nov. 29, 1932.   H. BURMEISTER   1,889,236
PROCESS OF PRODUCING FOAM PRODUCTS
Original Filed July 2, 1929
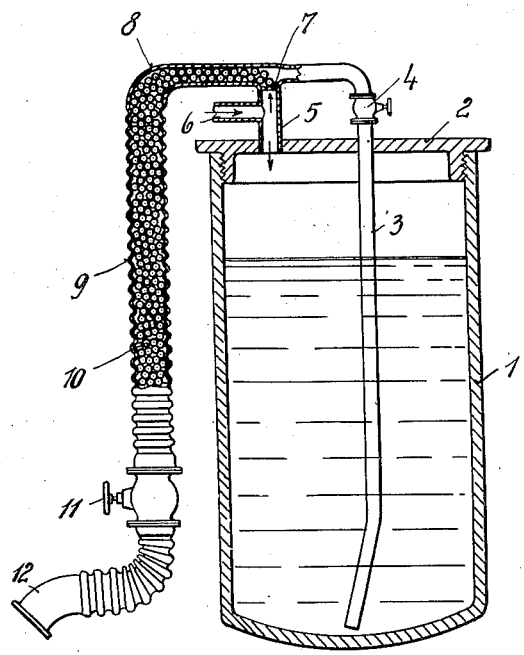
Inventor:
Hans Burmeister
by Karlkishury
Atty.

Patented Nov. 29, 1932

1,889,236

UNITED STATES PATENT OFFICE

HANS BURMEISTER, OF BERLIN-SCHMARGENDORF, GERMANY

PROCESS OF PRODUCING FOAM PRODUCTS

Original application filed July 2, 1929, Serial No. 375,557, and in Germany October 18, 1928. Divided and this application filed July 6, 1931. Serial No. 549,084.

My invention refers to a process of making foam products and more especially whipped cream without the cream being beaten into foamy condition in a beating apparatus as hitherto known. This application is a division of my copending application Serial No. 375,557, filed July 2, 1929.

In the whipping of cream air is intermingled so finely and intimately with the original substance by the whipping apparatus that a foamy final product is produced.

The present invention consists in causing the cream or other milk product and a gas such as air, oxygen or the like to be mixed by distributing them together under pressure over a large surface, care being taken that the one substance permeates the other. To this end the milk product and the gas are forced jointly through a distributing body offering a large distributing surface. This distributing body may be a porous body, such as meerschaum or some other natural or artificial cellular body. I prefer using a loose mass of small granular bodies, such as gravel, glass beads or the like of the smallest diameters obtainable.

Obviously if the liquid component and the gas are forced jointly under pressure through a distributing body of the kind described the two components will be subdivided into a multitude of minute particles and, theoretically speaking, each particle of one component will be enclosed between equally minute particles of the other component so that the contact surface between them will be particularly large. Owing to the surface tension of the liquid, the gas forced into the liquid will break it up into a multitude of minute bubbles, which in their entirety form a foam product of hitherto unheard of fineness and consequent stability.

I have thus ascertained by experiment and test that if for instance cream is mixed in this manner with a gas under pressure, such as air or oxygen, a whipped cream product is obtained which possesses a far greater stiffness and consistency and is far longer stable than all similar products hitherto produced.

In the drawing affixed to this specification and forming part thereof, a device which I have found suitable in carrying out the new process is illustrated diagrammatically by way of example in vertical section.

Referring to the drawing, 1 is a container filled, wholly or partially, with a milk product such as cream. 2 is a cover adapted to be screwed down on the opening of the container and to seal it. 3 is a rising tube, extending from a point near the container bottom to and through an opening in the cover 2, 4 being a valve inserted in the projecting part of the rising tube. 5 is a gas tube inserted in another opening of the cover 2 and 6 is a branch tube leading to a gas supply under pressure or to a pump capable of forcing a gas into the tube 5. The upper end of the tube 5 is connected with the projecting end of the rising tube and 7 is a throttling means, such as a strainer, a reducing valve or the like, inserted in the gas tube 5 or the rising tube near the point where these two meet. 8 is an extension of the rising tube which merges into the tubular vessel 9 surrounding the distributing body 10, which is here shown as being composed of a multitude of glass beads, the true diameter of which may be very much smaller than shown in the drawing. The walls of the container 9 are corrugated or screw-threaded in order to prevent the mixture from following the path of least resistance between the wall and the glass beads. 11 is a valve inserted in the tube 9 and 12 is a spout.

If a gas, such as air or oxygen, is forced through pipe 6 into the gas tube 5, it will force the cream in the container 11 through the rising tube in the direction indicated by the arrow in this tube, and a column of liquid will rise through the tube and through its extension 8. Another part of the gas will pass through the throttling device 7 directly into this extension and will mingle with the liquid, so that the cream and gas will be forced simultaneously through the distributing body 10 filling the tubular vessel 9, to be subdivided in passing through the innumerable channels of this body to the extent of being distributed over a large surface, whereby the cream and the gas are brought into a contact which is so intimate that the bubbles formed are of an almost infinitely small diameter. From the spout 12 will now emerge a foamy mixture of great stiffness, which will be stable for hours.

The whipped cream thus obtained has been found to be superior in stiffness and stability to the whipped cream obtained in the usual manner and, if oxygen has been incorporated instead of air, is moreover more palatable and hygenic than similar products hitherto produced.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. In the making of foams from liquids and gases, the process which comprises forcing a gas and a liquid milk product capable of producing a foam, simultaneously, through a distributing means having a large surface area of contact in such a manner that there is agitation and intimate intermingling of liquid and gas to form a foam.

2. The process of claim 1 wherein the said milk product is cream and the product produced is whipped cream.

3. The process of claim 1 wherein the distributing means is a constricted zone filled with a finely divided solid.

4. The process of making whipped cream which comprises passing a liquid milk product and oxygen, simultaneously, through a distributing means having a large surface area of contact in such manner that there is agitation and intimate intermingling of liquid and gas to form a foam.

5. In the making of foams from liquids and gases, the process which comprises applying gas pressure to body of a liquid milk product capable of producing a foam in such a manner as to cause said liquid to enter and pass through a zone of constricted cross-sectional area containing a distributing means of large surface contact area, simultaneously forcing a gas through said constricted zone in such manner that there is agitation and intimate intermingling of liquid and gas to form a foam and recovering the foam thereby produced at the exit of said constricted zone.

In testimony whereof I affix my signature.

HANS BURMEISTER.